May 12, 1953   W. SWIFT ET AL   2,637,864
MEANS FOR BARING THE ENDS OF INSULATED
ELECTRICAL CONDUCTORS
Filed March 20, 1950   3 Sheets-Sheet 1

Inventors
W. Swift
H. Coley
By Glascock Downing Hubbell
Attys.

May 12, 1953  W. SWIFT ET AL  2,637,864
MEANS FOR BARING THE ENDS OF INSULATED
ELECTRICAL CONDUCTORS
Filed March 20, 1950  3 Sheets-Sheet 3

Inventors
W. Swift
H. Coley
By ......... Attys.

Patented May 12, 1953

2,637,864

UNITED STATES PATENT OFFICE 2,637,864

MEANS FOR BARING THE ENDS OF INSULATED ELECTRICAL CONDUCTORS

William Swift, Sutton Coldfield, and Harold Coley, Cradley, England, assignors to Joseph Lucas Limited, Birmingham, England Application March 20, 1950, Serial No. 150,596
In Great Britain March 23, 1949

3 Claims. (Cl. 15—4)

In the manufacture of rotary wound armatures for dynamo electric machines, it is necessary to remove the enamel or other insulating material from the ends of the windings before these can be attached to the commutator segments.

The object of the present invention is to provide means for enabling the baring operation as indicated above to be performed in an effective and expeditious manner.

The invention comprises the combination of bearings for freely supporting the ends of the spindle of the armature to be treated, means carrying a pair of co-operating rotary scratch brushes adapted to act on some of the wire ends to be bared and therethrough to rotate the armature or the like, and a rotary scraper and means for carrying a scratch brush adapted to act on the ends of wires not treated by the first mentioned pair of brushes.

Figure 1:
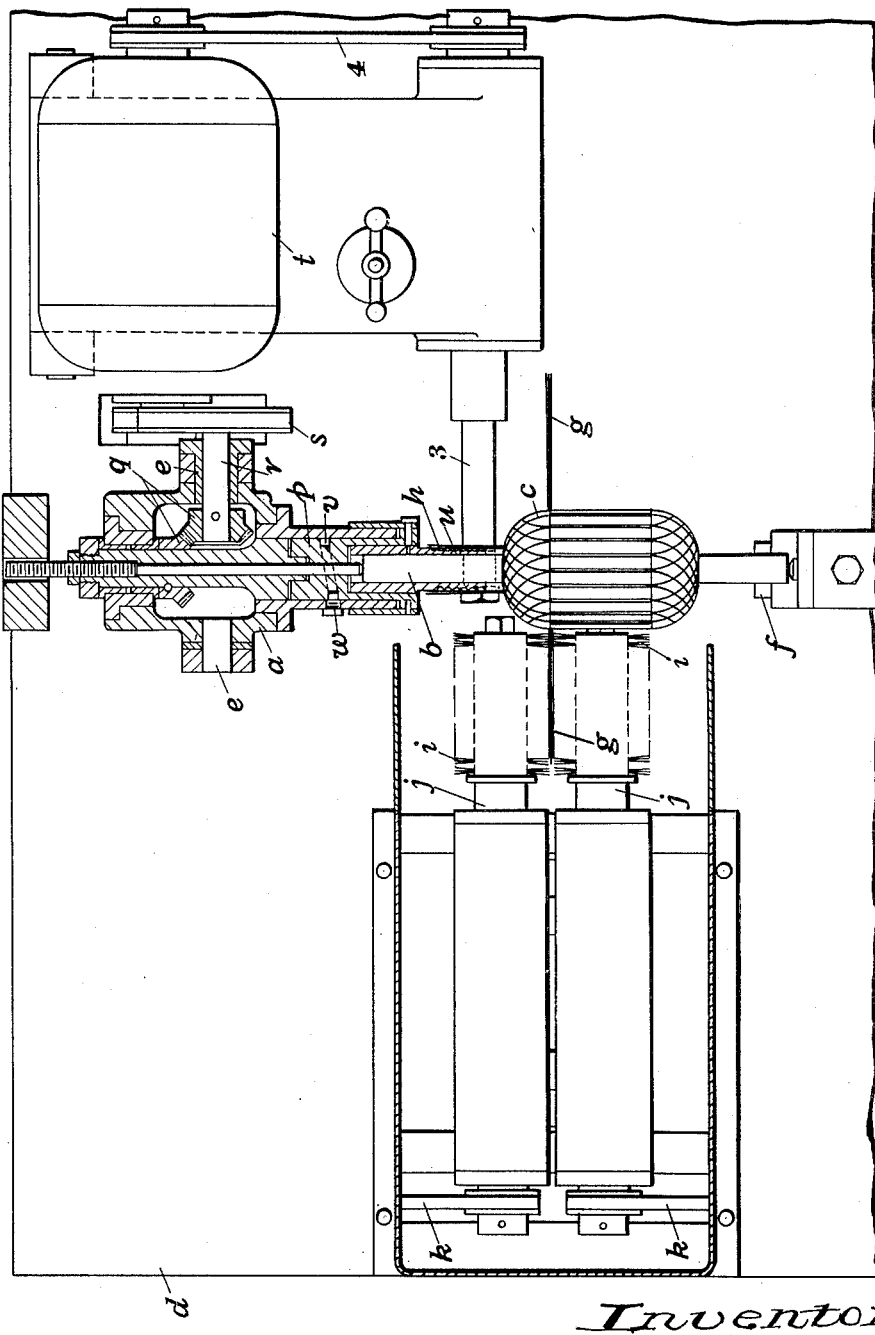

In the accompanying drawings:

Figure 1 is a sectional plan.

Figure 2:
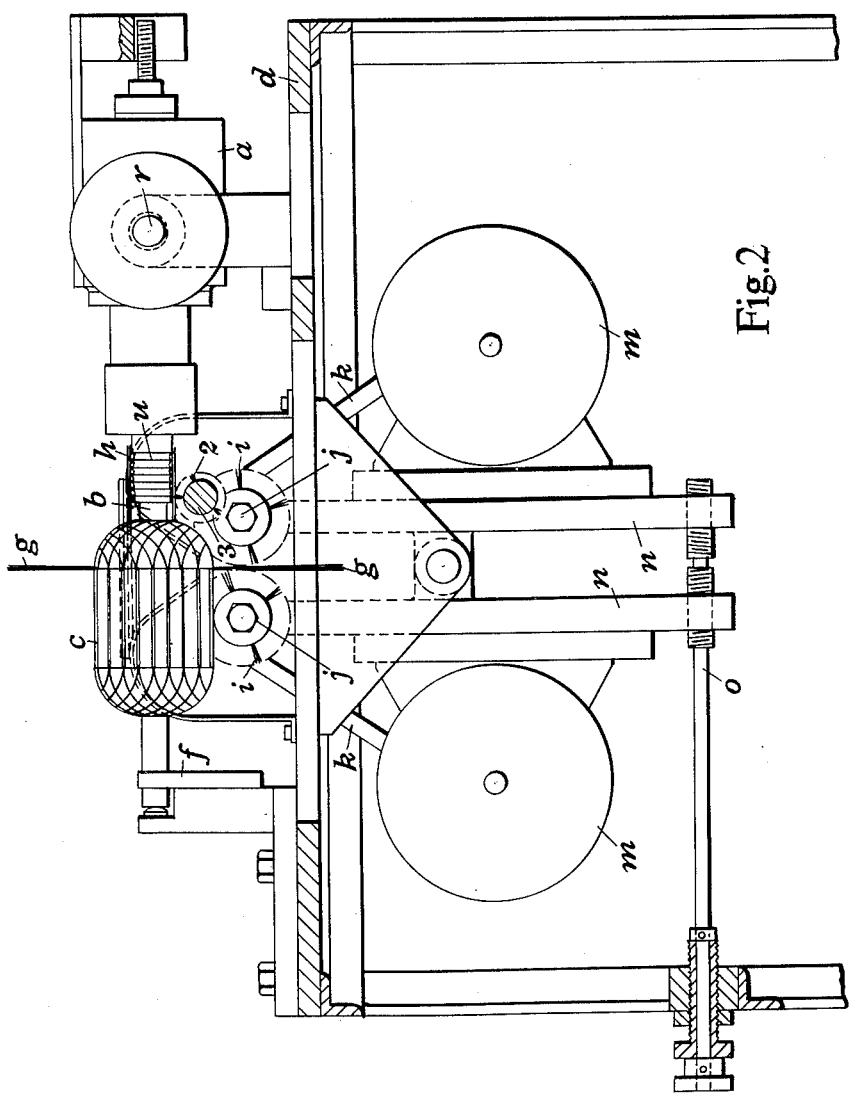
Figure 3:
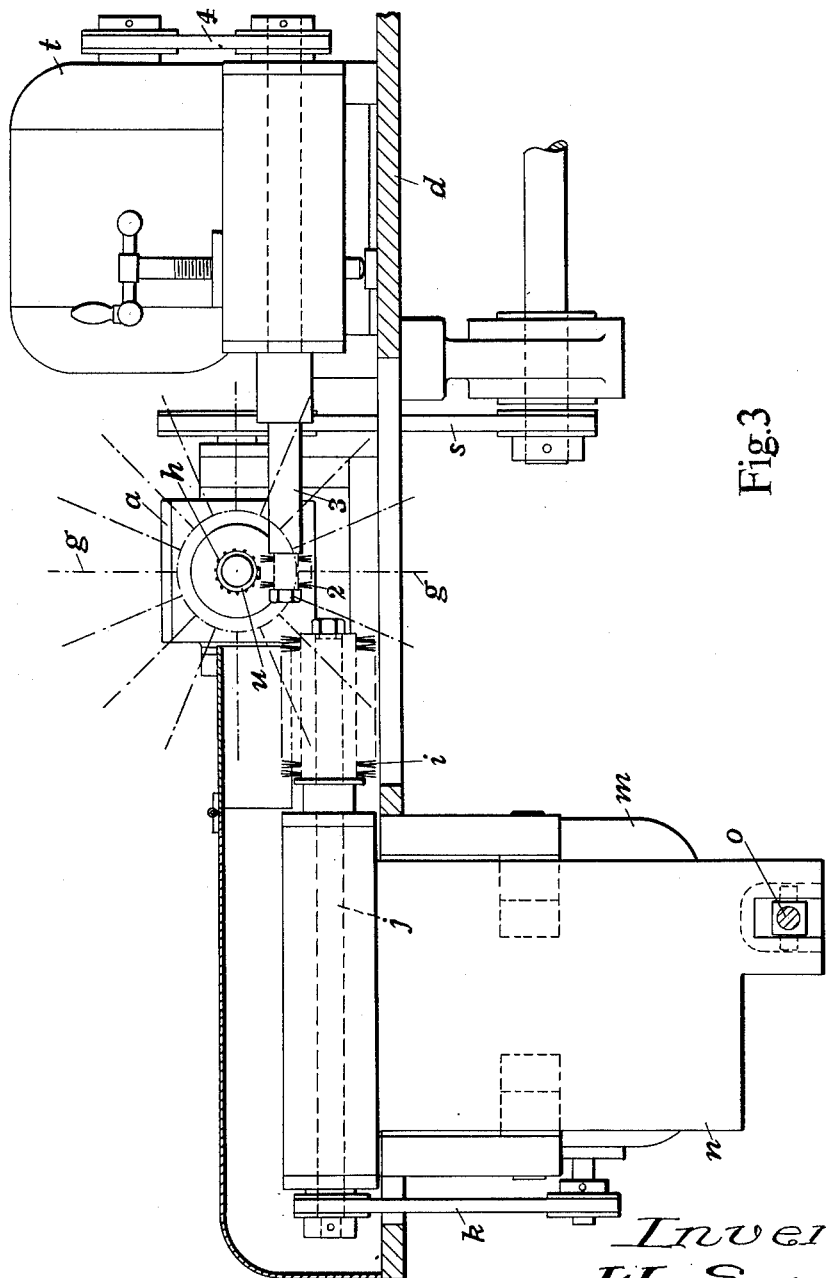

Figure 2 a sectional end elevation and Figure 3 a side elevation of a machine embodying the invention for baring the ends of armature windings.

Referring to the drawings, a hollow cylindrical body $a$ forming a headstock is adapted at one end to support one end of the spindle $b$ of the armature $c$. Preferably the headstock is supported on a base $d$ by trunnions $e$ enabling the headstock to be swung upwardly from its horizontal working position, to a position in which one end of the armature spindle can be conveniently inserted. For supporting the other end of the armature spindle in its horizontal position a forked bearing $f$ is provided on the base $d$ of the machine.

Usually the free ends of the armature windings to be bared, occupy two concentric circular positions at one end of the armature. Prior to the baring operation the wires in the outer group $g$ are bent outwardly by any convenient means so that they extend radially and occupy a plane at right angles to the axis of the armature. The inner group $h$ are left in the condition in which they are received from the armature winding machine, that is to say in a condition in which they lie substantially parallel with the armature axis.

For baring the ends of the wires in the outer group $g$ a pair of rotary scratch brushes $i$ are provided, these being mounted on spindles $j$ adapted to be driven by belts $k$ or other means from any convenient source of motion, such as electric motors $m$, and being arranged with their axes parallel with each other and with their peripheries in contact. These brushes are so disposed that the ends of the radially extending wires $g$ to be bared can pass between. They serve both to bare the ends of the said wires and also, by their action on the said ends, to impart rotary motion to the armature. To enable the pressure exerted by the brushes $i$ to be adjusted, the spindles $j$ are carried on pivot arms $n$ which are relatively adjustable by a screw $o$ (Figure 2).

For treating the ends of the other group of wires $h$, there is mounted in the headstock $a$ a spindle $p$ which is rotated through bevel gearing $q$ by a spindle $r$ carried by one of the headstock trunnions, this latter spindle being driven by a belt $s$ or other means from any convenient source of motion such as an electric motor. To the outer end of the said headstock spindle is secured a hollow cylindrical scraping tool $u$ (which in the example at present being described also receives the one end of the armature spindle $b$). The outer periphery of the scraping tool is formed with sharp-edged annular serrations, and the spindle, or at least the part of it immediately associated with the scraping tool is adapted to receive an axial reciprocatory motion as well as the rotary motion. The reciprocatory motion may be produced by the interaction of a cam groove $v$ on the spindle with a peg $w$ on the headstock. Alternatively the scraping tool may be formed with a sharp-edge helical groove. With this form of tool the reciprocatory motion may not be necessary though it may be provided if desired.

The wires $h$ in the inner group lie in contact with the scraping tool, and during the rotation of the armature they are pressed against the scraping tool by a rotary scratch brush 2 mounted in an adjacent position. This brush is carried by a spindle 3 driven by a belt 4 or other means from the motor $t$.

During the rotation of the armature the ends of both groups of wires are simultaneously bared by the action thereon of the brushes and scraper.

Whilst it is convenient to cause the wires of one group to be bent outwardly at right angles to the armature axis as above described, this is not essential, as, by suitably disposing the co-operating pair of scratch brushes $i$, the said ends may be bent to occupy oblique positions. Moreover, other subordinate details of construction or arrangement may be modified to suit different requirements.

Having thus described our invention what we claim as new and desire to secure by Letters Patent is:

1. A machine for baring the free ends of insulated wires extending in two, inner and outer, concentric groups from one end of an armature winding assembly on an armature spindle, comprising in combination a headstock for supporting one end of the armature spindle, a bearing for supporting the other end of the armature spindle, a pair of rotary scratch brushes between which the wire ends in the outer group can pass in succession after being outwardly deflected, and from which rotary motion can be imparted to the armature spindle and winding assembly by contact of the rotary scratch brushes with opposite sides of adjacent wire ends in the outer group, a rotary scraper carried by the headstock for acting simultaneously on the inner sides of the wire ends in the inner group, a third rotary scratch brush for acting on the outer sides of the wires in the inner group, and means for actuating the rotary scatch brushes and the scraper.

2. A machine as claimed in claim 1 and having in combination a base, and means pivotally supporting the headstock on the base.

3. A machine as claimed in claim 1 and having in combination with the headstock, cam means for imparting reciprocatory motion to the scraper.

WILLIAM SWIFT.
HAROLD COLEY.

References Cited in the file of this patent
UNITED STATES PATENTS

| Number | Name | Date |
|---|---|---|
| 1,532,717 | Schiller | Apr. 7, 1925 |
| 2,159,046 | Paxton | May 23, 1939 |
| 2,452,423 | Bass | Oct. 26, 1948 |